2,842,441
ANTIMICROBIAL PRESERVATIVE
Franz Meinrad Kuen, Vienna, Austria

No Drawing. Application July 25, 1955
Serial No. 524,280

14 Claims. (Cl. 99—48)

My present invention relates to preservatives for suppressing the development of micro-organisms in perishable materials of synthetic, animal or vegetable origin, more particularly in solutions, suspensions and emulsions containing organic matter adapted to be decomposed by the action of such organisms.

Heretofore, inhibition of microbial action has commonly been accomplished by the admixture of agents whose presence in the substance to be preserved was very often objectionable, especially in the case of nutriments and other products destined for human consumption, because of toxity, unpleasant taste, offensive odor or excessive discoloration. An alternative procedure has been the sterilization by a heating process whereby, however, not infrequently some thermally unstable ingredients were destroyed or altered to the detriment of the product as a whole.

An object of my invention is to provide a novel class of preservatives which, while being highly effective for their intended purpose, will have no harmful side effects toward either the treated product or a person ingesting or otherwise using such product.

Another object of my invention is to provide a preservative which is effective in considerably lower concentrations than those known heretofore.

A more specific object of my invention is to provide a preservative of this character which in a relatively short time will decay into harmless and relatively inert constituents.

I have found that compounds adapted to serve as spontaneously decaying temporary preservatives in liquids containing perishable organic matter, such as salts, diluted acids, carbohydrates, tannins, albumins, pectins, agar, alginates, alcaloids, coal tar dyes and the like, are the phenyl alkyl esters of halogenated fatty acids, especially those esters wherein the aliphatic side chains of the phenyl alkyl radicals have not more than two carbon atoms. The fatty acids may range from formic acid to butyric acid, with progressively diminishing activity as the number of carbon atoms increases. While any of the four halogen elements fluorine, chlorine, bromine and iodine may be used, fluorine and bromine, especially the latter, are preferred from a viewpoint of freedom from side effects. For the same reason, acetic acid is preferentially used as the fatty acid.

Example I

Beer is sterilized by admixing with it the benzyl ester of brominated acetic acid in a proportion of 0.003 to 0.007 milligram per gram of liquid. After a period of two to three days the additive decays into benzyl alcohol, glycolic acid and sodium or potassium bromide. All of these decay products occur widely in nature and are readily eliminated by the human organism upon ingestion.

As the additive is decomposed, its bactericidal or bacteriostatic effect ceases. To protect the treated product against recontamination, therefore, the same should be securely bottled or vacuum-packed while the preservative is still effective.

In the case of wine and fruit juices, a slightly higher concentration (0.005 to 0.01 milligram per gram) is recommended. In these products, because of their greater acidity, the preservative may be decomposed only after one or two weeks.

Example II

The growth of microorganisms, such as bacteria, molds, saccharomyces, schizosaccharomycetes, mycoderma and other fungi, in solutions of carbohydrates, tannins, albumins, pectins etc. is prevented by admixing with the solution the methyl phenyl carbinol ester of brominated acetic acid in a proportion of 0.002 to 0.005 milligram per gram of solution.

Example III

Glass vessels for the culturing of yeasts and other microorganisms are sterilized by being completely filled, to overflow, with a 0.0005% aqueous solution of the phenyl ethyl ester of fluorinated acetic acid. After the decay of the sterilizing agent, the solution is displaced by sterile air whereupon the vessels may be taken into use without further sterilization by heating or other means. In like manner it is possible to sterilize the culture media to be employed therein.

Example IV

Alkaloid solutions are sterilized by an admixture of 0.005 milligram of the benzyl ester of fluorinated acetic acid per gram of solution.

The relative effectiveness of fluorine, chlorine, bromine and iodine in the compounds herein disclosed appears to be of the order of 1:1:10:20. Thus it will be understood that the substitution of bromine for fluorine in, say, Example III will enable a reduction of the quantity of preservative employed, the opposite being true if fluorine is to be used instead of bromine in, for instance, the procedure described in Example II. I have found, on the other hand, that the decay of the fluorinated compounds takes considerably longer than that of the brominated ones, whereby the former will retain their effectiveness for more extended periods and will be useful particularly in industrial applications such as, for example, the prevention of mold formations in paints and varnishes. A comparison between the phenyl ethyl ester and the benzyl ester of halogenated acetic acid shows that the former is about one-fourth as effective as the latter. Generally, as will be apparent from the foregoing examples, the admixture of the preservative in a proportion of 0.0002% to 0.001%, by weight, will be satisfactory for most purposes.

I claim:

1. The combination of a liquid containing perishable organic matter with a preservative admixed in a proportion of the order of 0.0002% to 0.001%, by weight, of said liquid, said preservative comprising an alkyl phenyl ester of a halogenated fatty acid.

2. The combination according to claim 1, wherein said fatty acid has not more than four carbon atoms.

3. The combination according to claim 1, wherein the alkyl phenyl radical of said ester has an aliphatic side chain of not more than two carbon atoms.

4. The combination according to claim 1, wherein said fatty acid is acetic acid.

5. The combination according to claim 1, wherein said halogenated acid is selected from the group which consists of fluorinated and brominated fatty acids having not more than four carbon atoms.

6. The combination according to claim 5, wherein said fatty acid is fluorinated acetic acid.

7. The combination according to claim 5, wherein said fatty acid is brominated acetic acid.

8. The combination according to claim 1, wherein said fatty acid is selected from the group which consists of fluorinated and brominated acetic acids, said ester being selected from the group which consists of benzyl, methyl phenyl carbinol, and ethyl phenyl esters.

9. The method of temporarily sterilizing a liquid containing perishable organic matter which comprises admixing with said liquid a preservative comprising an alkyl phenyl ester of a halogenated fatty acid.

10. The method according to claim 9, wherein said preservative is admixed in a proportion of the order of 0.0002% to 0.001%, by weight, of said liquid.

11. The method according to claim 9, wherein said fatty acid is selected from the group which consists of fluorinated and brominated acetic acids, said ester being selected from the group which consists of benzyl, methyl phenyl carbinol, and ethyl phenyl esters.

12. The method according to claim 9, comprising the further step of allowing said preservative to become decomposed into relatively inert decay products before taking said liquid into use.

13. The method of inhibiting the growth of microorganisms in a liquid destined for human consumption which comprises the steps of admixing with said liquid an alkyl phenyl ester, with not more than two carbon atoms in its aliphatic side chain, of brominated acetic acid and allowing said ester to become decomposed into relatively inert and harmless decay products before offering said liquid for ingestion.

14. The method according to claim 13, wherein said ester is admixed with said liquid in a proportion of between substantially 0.002 and 0.01 milligram per gram of said liquid.

References Cited in the file of this patent

Chem. Abstracts, vol. 48–1954–9570[1].